United States Patent
Seurat Guiochet et al.

(10) Patent No.: US 7,637,206 B2
(45) Date of Patent: Dec. 29, 2009

(54) PRESSURE-COOKING APPLIANCE PROVIDED WITH AN EXCESS PRESSURE SAFETY DEVICE, AND A GASKET FOR SAID APPLIANCE

(75) Inventors: Claire Marie-Aurore Seurat Guiochet, Dijon (FR); Daniel Jean-Marie Anota, Dijon (FR)

(73) Assignee: SEB S.A., Ecully Cedex (FR)

( * ) Notice: Subject to any disclaimer, the term of this patent is extended or adjusted under 35 U.S.C. 154(b) by 281 days.

(21) Appl. No.: 10/998,317

(22) Filed: Nov. 26, 2004

(65) Prior Publication Data

US 2005/0132895 A1 Jun. 23, 2005

(30) Foreign Application Priority Data

Nov. 27, 2003 (FR) .................................. 03 13935

(51) Int. Cl.
*A47J 27/04* (2006.01)
*A47J 27/08* (2006.01)

(52) U.S. Cl. ............................ 99/337; 99/403; 219/440; 220/315; 220/316

(58) Field of Classification Search ................... 99/337, 99/338, 403, 330, 340, 342; 219/440, 441; 220/315, 316, 573.1, 912
See application file for complete search history.

(56) References Cited

U.S. PATENT DOCUMENTS

| 5,121,852 | A | * | 6/1992 | Wilkes | 220/203.12 |
|---|---|---|---|---|---|
| 5,927,183 | A | | 7/1999 | Lee | 99/337 |
| 6,173,643 | B1 | * | 1/2001 | Qian et al. | 99/339 |
| 6,672,595 | B2 | * | 1/2004 | Park | 277/628 |
| 6,877,633 | B2 | * | 4/2005 | Niese | 220/315 |

FOREIGN PATENT DOCUMENTS

| CH | 682 538 | 10/1993 |
|---|---|---|
| FR | 632 268 A | 1/1928 |
| FR | 2 796 542 | 1/2001 |
| WO | WO 01 72184 A | 10/2001 |

* cited by examiner

*Primary Examiner*—Reginald L Alexander
(74) *Attorney, Agent, or Firm*—Thomas, Kayden, Horstemeyer & Risley, LLP

(57) ABSTRACT

An appliance for cooking under pressure comprises a lid and a bowl having a side wall, said lid and side wall defining an interstitial space presenting an initial cross section of predetermined initial radial dimension for receiving an annular sealing gasket. The bowl, the lid, and the gasket are designed so that when the pressure inside the vessel reaches a predetermined critical value, the interstitial space presents a predetermined critical radial dimension such that the difference between the initial dimension and the critical dimension is great enough to cause leaktight contact between the gasket and the side wall to be broken. The invention is particularly applicable to domestic pressure cookers.

14 Claims, 5 Drawing Sheets

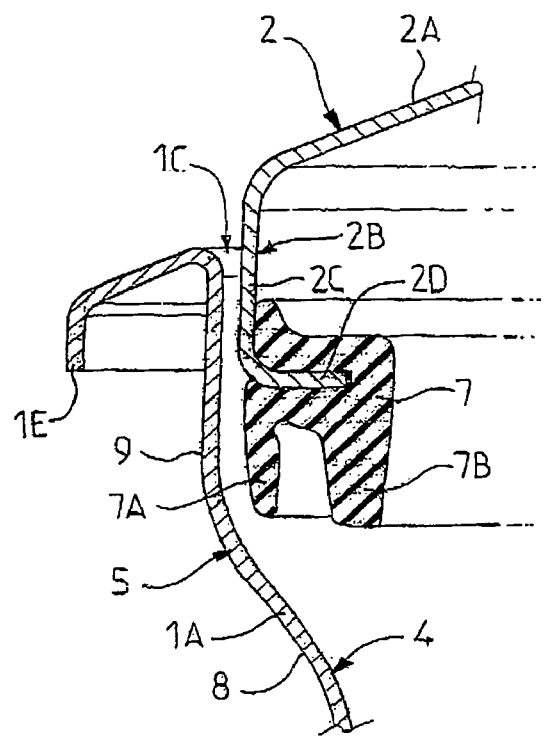
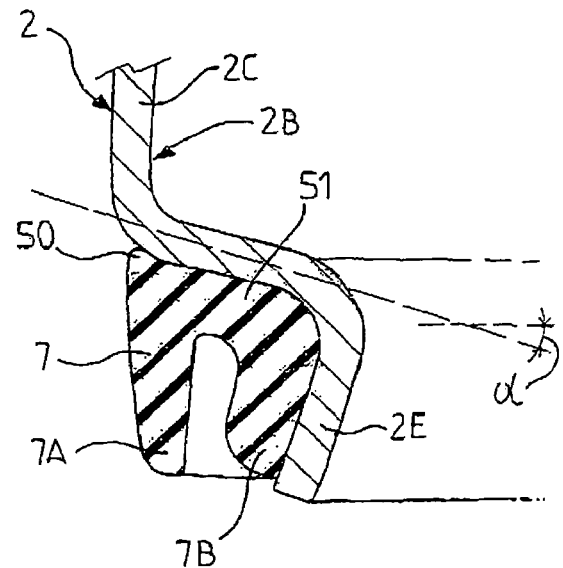
FIG.8　　　　　　　FIG.9
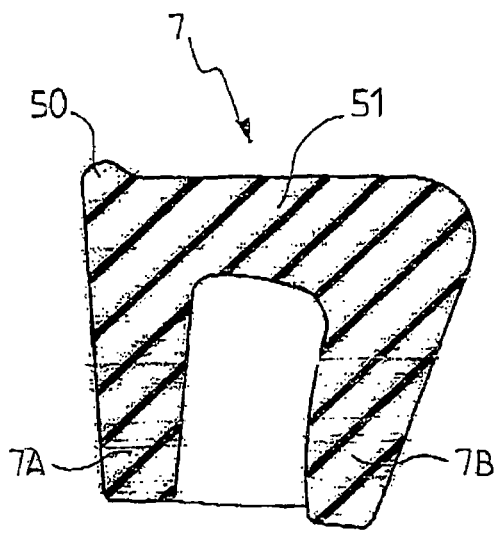
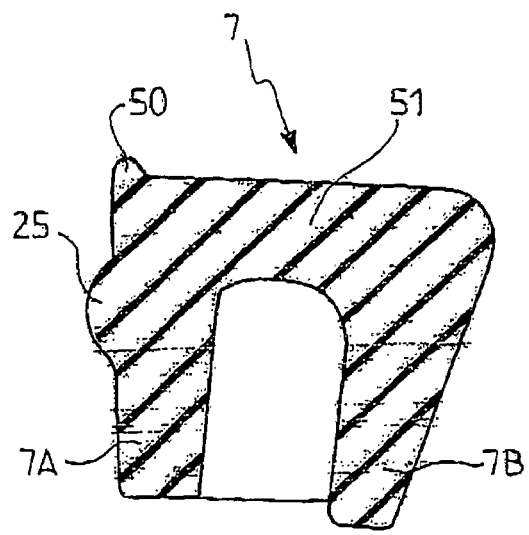
FIG.10　　　　　　FIG.11

PRESSURE-COOKING APPLIANCE PROVIDED WITH AN EXCESS PRESSURE SAFETY DEVICE, AND A GASKET FOR SAID APPLIANCE

CROSS-REFERENCE TO RELATED APPLICATION

This Application claims priority to copending French Patent Application entitled, "A Pressure-Cooking Appliance Provided With An Excess Pressure Safety Device, And A Gasket For Said Appliance," having Application No. FR-03 13935, filed on Nov. 27, 2003, which is entirely incorporated herein by reference.

The present invention relates to the general technical field of pressure cooking appliances for domestic use such as pressure cookers, comprising a bowl and a lid which can be locked on the bowl to form a leaktight cooking vessel, said appliances being intended to cook food contained in the bowl under steam pressure.

More particularly, the present invention relates to a domestic appliance for pressure cooking food, comprising a bowl provided with a side wall and a lid which can be positioned and locked on said bowl, said lid and side wall co-operating, when the lid is positioned and locked on the bowl, to define an annular interstitial space having an initial cross section presenting a predetermined radial dimension, termed the initial dimension, said interstitial space being intended to receive an annular gasket designed to be interposed between the side wall and the lid to produce a substantially leaktight cooking vessel.

BACKGROUND OF THE INVENTION

Pressure cooking appliances for domestic use, of the pressure cooker type, are well known.

Such appliances generally comprise a bowl in the form of a base from which a side wall extends substantially vertically. The base and side wall define a receptacle which is open at its upper end, to receive food for cooking.

Such known appliances also include a lid, intended to be positioned and locked on the bowl.

A gasket in the form of a ring matching the shape of the interface between the bowl and the lid can produce a cooking vessel that is substantially leaktight, i.e. one in which pressure can rise.

In particular, pressure cookers are known with a re-entrant lid, i.e. with a lid that is provided with a dropped annular edge for insertion inside the bowl facing the inside face of the side wall of said bowl.

In such pressure cookers, the gasket is interposed between the side wall and the dropped edge.

Such known pressure cookers also include a pressure regulating valve that keeps the operating pressure within the cooking vessel substantially constant, and a safety valve that serves, in the event of failure of the regulating valve, to cause safety decompression and prevent excess pressure from building up inside the vessel, since that would be dangerous to the user.

However, if both the regulating valve and the safety valve fail, known pressure cookers do not have any additional safety means that can decompress the appliance under safety conditions that are acceptable to the user, and that can prevent destruction of the appliance and all the risks associated therewith.

OBJECTS AND SUMMARY OF THE INVENTION

Thus, an object of the invention is to provide a novel domestic pressure cooking appliance which can overcome the various disadvantages mentioned above and which ensures excellent overall safety in use.

Another object of the invention is to propose a novel domestic pressure cooking appliance of particularly simple design.

Another object of the invention is to provide a novel pressure cooking appliance which allows calibrated, localized venting of steam when the pressure inside the appliance exceeds a predetermined safety level.

Another object of the invention is to provide a novel pressure cooking appliance which allows progressive decompression of the cooking appliance when the pressure inside said appliance exceeds a predetermined safety level.

Another object of the invention is to provide a gasket for a pressure cooking appliance which can improve the overall safety of the appliance.

Another object of the invention is to provide a novel gasket for a pressure cooking appliance which optimizes safety in the event of excess pressure, in a controlled and localized manner.

The above objects of the invention are achieved by a domestic food pressure cooking appliance comprising a bowl provided with a side wall and a lid which can be positioned and locked on said bowl, said lid and side wall co-operating, when the lid is positioned and locked on the bowl, to define an annular interstitial space having an initial cross section having a predetermined radial dimension, termed the initial dimension, said interstitial space being intended to receive an annular gasket designed to be interposed between the side wall and the lid to produce a cooking vessel that is substantially leaktight, wherein the bowl, the lid, and the gasket are designed so that when the pressure inside the vessel reaches a predetermined critical safety value, the interstitial space at least locally has a critical cross section having a predetermined radial dimension, termed the critical dimension, which is more than the initial dimension, the difference between the initial dimension and the critical dimension being sufficiently great for the leaktight contact between the gasket and the side wall and/or the lid to be broken, thus causing decompression of the vessel.

The above objects of the invention are also achieved by a gasket for a cooking appliance in accordance with the invention.

BRIEF DESCRIPTION OF THE DRAWINGS

Further features and advantages of the invention become apparent from the description below, made with reference to the accompanying drawings given purely by way of illustration and being non-limiting in nature, in which:

FIG. 8 is a fragmentary longitudinal sectional view of a second embodiment of a cooking appliance of the invention when the user is placing the lid on the bowl, said appliance being provided with a second embodiment of a gasket in accordance with the invention;

FIG. 9 is a fragmentary longitudinal sectional view of a third embodiment of an appliance of the invention, said appliance being provided with a third variation of the gasket of the invention;

FIG. 10 is a cross section of the gasket shown in FIGS. 2, 3, 5 and 6;

FIG. 11 is a cross section of a fourth variation of a gasket in accordance with the invention;

MORE DETAILED DESCRIPTION

Figure 1:
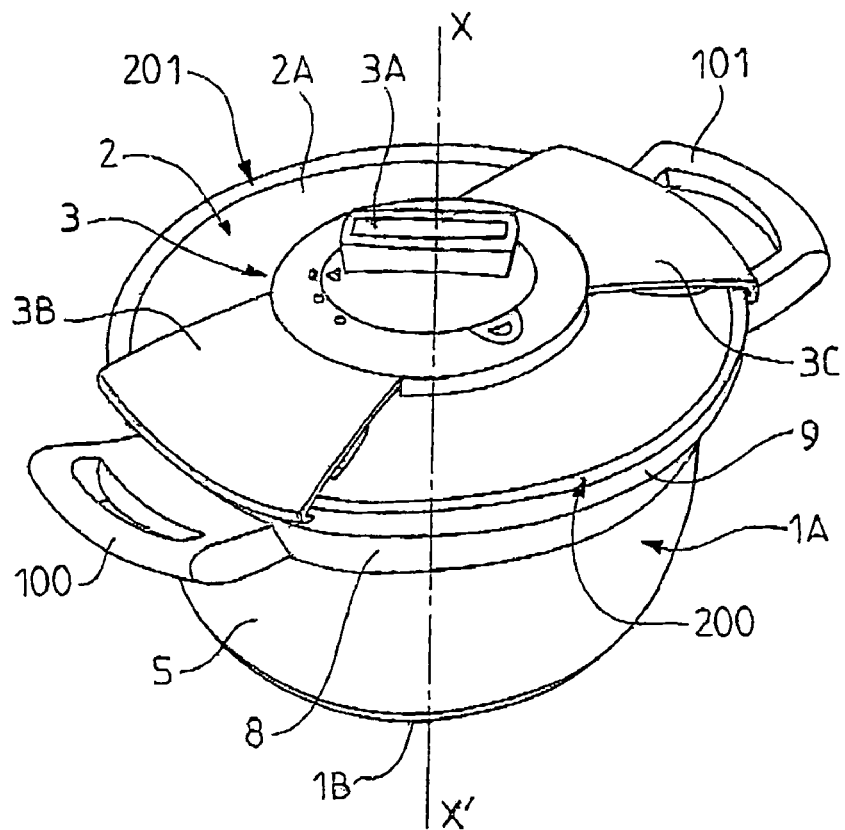
FIG. 1 is a general perspective view of a first embodiment of a domestic pressure cooking appliance of the invention.
Figure 2:
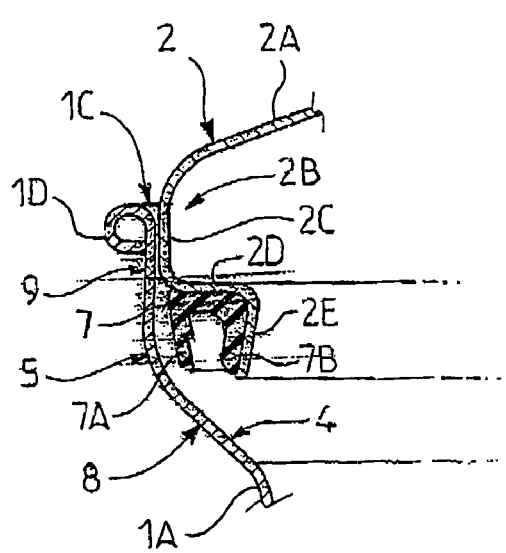
FIG. 2 is a fragmentary longitudinal sectional view of the cooking appliance of FIG. 1 while the user is placing the lid on the bowl, said appliance being provided with a gasket in accordance with a first embodiment of the invention.

The cooking appliance of the invention is intended to cook different foods under pressure in a domestic context.

Preferably, the appliance of the invention is a pressure cooker.

In conventional manner, the cooking appliance of the invention comprises a bowl 1 forming a cooking receptacle, preferably with substantial symmetry of revolution about an axis X-X'. The adjective "vertical" as used below corresponds to the direction of this axis of symmetry X-X'. The radial direction is defined relative to the axis X-X'.

Preferably, the domestic cooking appliance of the invention also includes a pressure regulating means (not shown) of the valve type arranged to keep the relative pressure inside the vessel to a substantially constant predetermined value termed the operating pressure, and a safety valve (not shown) which ensures decompression of the appliance in the event of failure of the regulating valve.

Preferably, the cooking appliance additionally includes an activatable/deactivatable decompression means (not shown) arranged, when it is activated, to allow the pressure inside the vessel to drop. Advantageously, the functions of the decompression means can be carried out by the pressure regulating means, which in this case is bifunctional in nature.

As is conventional, the bowl is formed from a metal material such as stainless steel and is provided with a side wall 1A extending generally in the vertical direction from a base 1, which is substantially circular in form, for example.

Said side wall 1A extends between the base 1B and an upper opening 1C via which the user can introduce food to be cooked into the bowl.

The upper edge of the side walls 1A, defining the upper opening 1C, is preferably in the form of a rolled edge 1D (cf FIGS. 2 to 5 and 11, 12) or a folded over edge 1E (in the variations shown in FIGS. 8 and 16 to 20).

The side wall 1A has an inner face 4 located facing the inside of the bowl 1, and an opposite outer face 5 located facing the outside of the bowl 1.

The bowl 1 can also include gripping devices such as handles 100, 101, preferably two in number and fixed, for example, on the bowl 1 in a diametrically opposing manner.

The appliance also comprises a lid 2 for placing and locking on said bowl 1 to form a substantially leaktight cooking vessel, i.e. sufficiently airtight to allow the pressure to rise.

The lid 2 is advantageously generally disk shaped and can be locked or unlocked relative to the bowl 1 by means 3 for locking/unlocking the lid 2 relative to the bowl 1.

More particularly, reference is made below to a locking/unlocking means 3B, 3C with jaws controlled by a rotary handle 3A as shown in FIG. 1. The jaws 3B, 3C can thus be in the form of metal plates mounted to move in radial translation on the lid 2 and having a U shaped profile at their outer ends, in order to be able to clamp together the lid 2 and the peripheral edge of the bowl 1 in the locked position, at least locally.

Advantageously, as shown in FIG. 1, the jaws can be two in number and can be positioned so as to be diametrically opposite about the general axis of symmetry X-X' of the appliance.

The means 3 for locking/unlocking the lid 2 relative to the bowl 1 is not, however, restricted to a jaw system, and can, for example, be based on the principle of a bayonet lock, a segment lock, a stirrup lock, or any other means that is well known to the skilled person while remaining within the scope of the invention.

Figure 3:
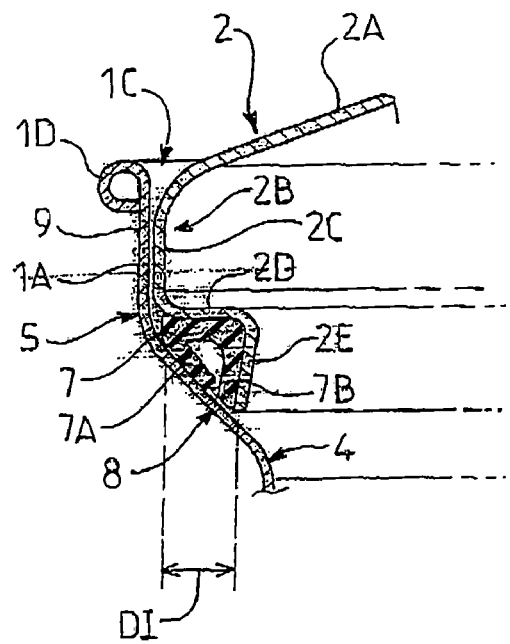
FIG. 3 is a fragmentary longitudinal sectional view of the cooking appliance of FIG. 2 when the lid is locked on the bowl.
Figure 4:
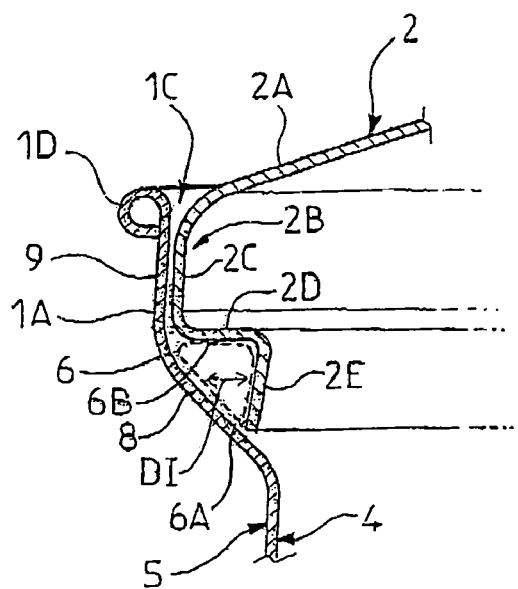
FIG. 4 is identical to FIG. 3, except that the gasket is not shown.

In accordance with the invention, and when the lid 2 is positioned and locked on the bowl 1 (as shown in FIGS. 3 and 4), the lid 2 and the side wall 1A of the bowl 1 co-operate to define an annular interstitial space 6 having an initial cross section having a predetermined radial dimension, termed the initial dimension DI, said interstitial space 6 being intended to receive an annular gasket 7 designed to be interposed between the side wall 1A and the lid 2, to produce a substantially leaktight cooking vessel.

The radial dimension DI is a dimension which is characteristic of the thickness, in the radial direction, of the cross section of the interstitial annular space 6 as seen from the viewpoint of the gasket 7.

Figure 7:
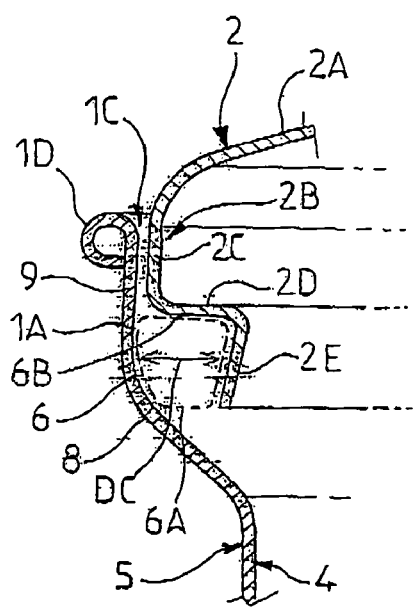
FIG. 7 is identical to FIG. 6, except that the gasket is not shown.

This dimension can be the median or mean thickness of said cross section, but alternatively, it can be the thickness at the base 6A of the cross section or at the top 6B thereof (cf FIGS. 4 and 7).

The annular gasket 7 can, for example, be formed from an elastomeric material and can have any profile, it being understood that its design is such that when the lid 2 is positioned and locked on the bowl 1, it comes into leaktight contact both against the side wall 1A and against the lid 2 to prevent any steam from leaking out between the lid 2 and the bowl 1, and thus allowing the pressure inside the appliance to rise.

In accordance with an important feature of the invention, the design of the bowl 1, of the lid 2, and of the gasket 7 is such that when the pressure inside the vessel reaches a predetermined critical safety value, the interstitial space 6 has, at least locally, a critical cross section of predetermined radial dimension termed the critical dimension DC that is greater than the initial dimension DI, the difference between the initial dimension DI and the critical dimension DC being sufficiently great for the leaktight contact between the gasket 7 and the side wall 1A and/or the lid 2 to be broken, thus causing safety decompression of the vessel, by placing the inside of the vessel in communication with the outside.

The principle of the invention is thus based on a lateral geometric modification of the interstitial space 6 receiving the gasket 7 when a critical pressure is reached, this geometric modification being sufficient relative to the flexibility of the gasket 7 to generate decompression of the vessel.

In other words, from the point of view of the gasket 7, during passage from the initial cross section to the critical cross section, it will perceive an increase in the radial direction of the space which it has to occupy to seal the appliance, this increase becoming too great for the gasket 7 to provide sealing when the predetermined critical pressure is reached.

Advantageously, passage from the initial cross section (cf FIG. 4) to the critical cross section (cf FIG. 7) is at least partially achieved by displacement of the lid 2 relative to the bowl 1.

This displacement of the lid 2 relative to the bowl 1 may be local only, and may, for example, arise from deformation of the lid under the effect of pressure, in particular in zones of the lid that are not under the direct influence of the jaws 3B, 3C.

Said displacement can also be constituted by overall movement in translation of the lid 2 relative to the bowl 1 under the effect of the pressure, and in particular outward axial translation of the lid 2 relative to the bowl 1, i.e. overall upward displacement of the lid 2 in the vertical direction X-X'.

Advantageously, passage from the initial cross section to the critical cross section can also be at least partially achieved by radial deformation of the bowl 1. As an example, when the upper opening 1C is circular in cross section, it may tend to become oval under the action of pressure, i.e. it may expand in the radial direction in diametrically opposite localized zones 200, 201.

In particular, for the cooking appliance of the invention shown in FIG. 1, the localized radial deformation zones 200, 201 correspond to zones which are not subject to the direct action of jaws 3B, 3C, and are thus capable of deforming more easily under pressure.

The dimensions and the deformation capacity of the bowl 1 and the lid 2 are preferably designed so that when the predetermined critical pressure is reached, the lid 2 and the bowl 1 move away from each other at least locally by deformation and/or overall translation.

Figure 6:
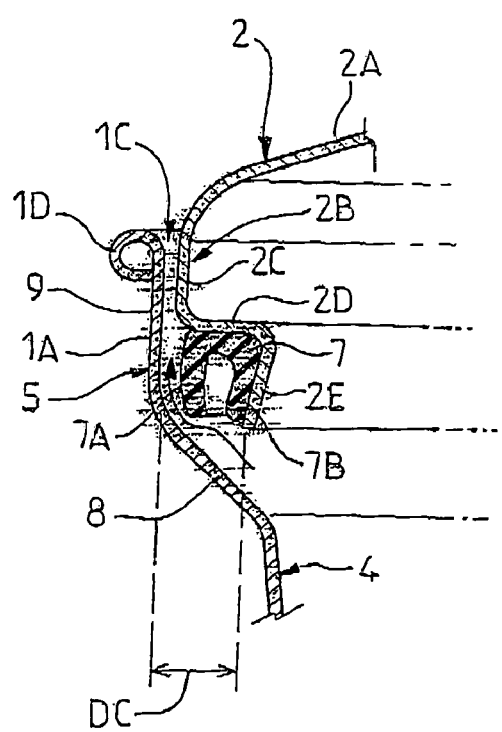
FIG. 6 is a fragmentary longitudinal sectional view of the cooking appliance shown in FIGS. 2, 3 and 5 during safety decompression, when subjected to an abnormally high internal pressure and the traditional safety means have not functioned.

This movement away from each other causes the thickness DI of the interstitial space 6 to increase to a point at which the gasket 7 is no longer capable of fitting snugly against both the side wall 1A and the lid 2 (cf FIG. 6), primarily because of the predetermined flexibility of the gasket.

Preferably, then, the gasket 7 plays a passive role in establishing safety venting, with the venting itself being advantageously obtained by relative radial movement of the lid and bowl away from each other, combined with a suitable dimensions and flexibility of the gasket.

In other words, the gasket 7 advantageously remains permanently stationary relative to the lid, even in the event of accidental excess pressure. The relative spacing between the lid and the side wall of the bowl produces the desired venting or leak effect, rather than positive displacement (deformation or extrusion) of the gasket itself.

Passage from the initial cross section to the critical cross section can alternatively be at least partially achieved by displacement of the gasket 7 relative to the lid 2.

In particular, the gasket can be envisaged to be capable of being displaced in an axial upward direction, at least locally. Said displacement can be by overall translation or by deformation of the gasket. In this case, when the pressure reaches the predetermined critical safety value, displacement or deformation of the gasket 7 itself places said gasket 7 in a configuration in which it has a larger free space in the radial direction, which free space, defined between the side wall 1A and the lid 2, is too large in the radial direction relative to the dimensions and flexibility of the gasket for the gasket 7 to act as the leaktight element, thus causing decompression venting.

The gasket 7 may be of any conventional type which is known to the skilled person, provided that its elastic properties in the radial direction allow it, when the lid 2 is locked on the bowl 1 (cf FIG. 3) or when the pressure cooker is kept at its operating pressure (cf FIG. 5) to fit snugly against both the side wall 1A and the lid 2, while being incapable, beyond a predetermined critical safety pressure, of accommodating the increase in thickness DI of the interstitial space 6, to cause safety venting.

Thus, the gasket 7 has section and flexibility that are low enough to ensure it can no longer guarantee leaktightness of the vessel when the interstitial space 6 reaches the critical dimension DC.

In particular, the gasket 7 may have a substantially square, rectangular, or rounded section that may, for example, be solid and massive.

Advantageously, as shown in the figures, the gasket 7 is a double-lipped gasket.

Preferably, the annular gasket 7 is substantially U shaped in section, the arms of the U being directed downwardly when the gasket is mounted in the operating position in the appliance, the arms of the U each respectively forming a first lip 7A and a second lip 7B, while the web of the U forms the bead 51 of the gasket 7.

Preferably, the first lip 7A ensures a seal with the side wall 1A, while the second lip 7B ensures a seal with the lid 2.

Figure 5:
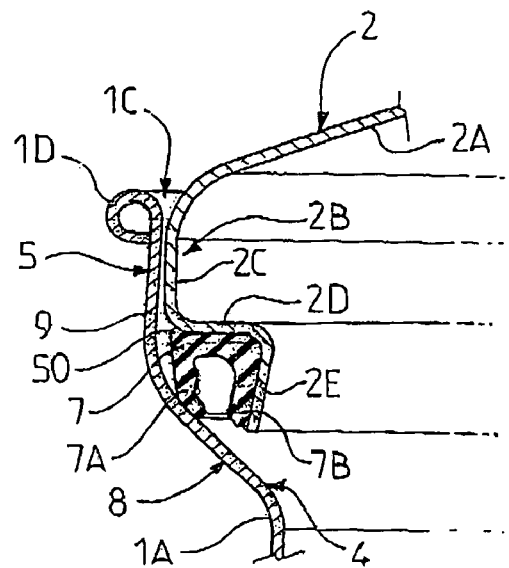
FIG. 5 is a fragmentary longitudinal sectional view of the appliance shown in FIGS. 2 and 3 when it is under pressure, in normal operation.

The seals of the first and second lips 7A, 7B are, of course, obtained when the lid 2 is positioned and locked on the bowl 1, as can be seen in particular in FIGS. 3 and 5, and so long as the pressure inside the vessel does not exceed the critical safety pressure.

Preferably, the gasket 7 is designed so that when the safety pressure is reached or exceeded inside the pressure cooker, the first lip 7A separates from the side wall 1A sufficiently to ensure decompression of the vessel.

This mode of operation is particularly suitable in the case corresponding to the variations shown in the figures in which the gasket 7 is mounted integrally with the lid 2, for example by stretching the gasket 7 to fit on the lid 2.

In this case, the second lip 7B forms a fixed lip which is permanently flush against the lid 2, while the first lip 7A forms a free lip which can deflect to different extents to provide a seal.

However, it is entirely possible for the gasket 7 to be mounted integrally with the bowl 1. In that case, the second lip 7B is advantageously designed to break contact with the lid 2 beyond the critical safety pressure, the first lip 7A preferably remaining in permanent contact with the side wall 1A.

Further details of the variations of the invention shown in FIGS. 1 to 21 are described below. These variations all employ a double lipped gasket 7 of the type generally described above.

In a first variation, shown in FIGS. 2 to 7, the side wall 1A of the bowl extends in the zone 8 defining the interstitial space 6 in a substantially divergent manner from the base 1B towards the upper opening 1C.

In other words, the wall 1A preferably flares outwardly at the interstitial space 6.

To this end, the side wall 1A may comprise a tapered portion at zone 8 which is extended by a right cylindrical portion 9 in the direction of the opening 1C.

The portion of the side wall 1A located between the base 1B and the zone 8 can be of any shape, for example substantially right cylindrical and vertical, or it can be perceptibly tapered.

In this first variation, the lid 2 has a top 2A that is preferably slightly curved and convex.

The lid 2 also has a dropped side edge 2B extending downwards from the periphery of the top 2A relative to the vertical direction X-X'.

The side edge 2B is intended to be inserted inside the bowl 1 when the lid 2 is positioned and locked thereon, which means that the side edge 2B is substantially surrounded by the inner face 4 of the side wall 1A when the lid 2 is positioned in the bowl 1.

Thus, the lid 2 can be described as penetrating into the bowl.

The annular interstitial space 6 extends radially between the side wall 1A and the side edge 2B.

Advantageously, the side edge 2B of the lid 2 extends from the peripheral edge of the top 2A along a substantially vertical section 2C, which is itself prolonged by a second, substantially horizontal, section 2D, which extends radially as a re-entrant towards the inside of the lid 2 and the bowl 1, substantially parallel to the base 1E.

Finally, the second section 2D is itself prolonged by a third section 2E which extends substantially downwardly and outwardly of the appliance, i.e. in a slightly oblique direction relative to the vertical direction X-X'.

The side edge 2B of the lid 2 of the cooking appliance corresponding to the variation shown in FIGS. 2 to 7 thus has substantially the shape of a stairway, with a first riser 2C followed by a step 2D which is in turn followed by a second riser 2E.

The annular interstitial space 6 is thus defined by the inner face 4 of the zone 8 of the side wall 1A and by the second and third sections 2D, 2E of the side edge 2B of the lid 2 (cf FIG. 4).

The interstitial space 6 thus forms a recess for the gasket 7 which comes flush against the inner face 4 of the side wall 1A in zone 8 thereof and against the lid 2, i.e. against the second and third sections 2D, 2E, preventing steam from leaking out.

More precisely, the gasket 7 is stretched to fit on the third section 2E, so that the second lip 7B is flush against the outer face of said second section, while the bead 51 of the gasket connecting the first and second lips 7A, 7B bears against the second section 2D. The first lip 7A is free and is intended to be flush against the inner face 4 of the side wall 1A at the tapered zone 8.

In a second embodiment, shown in FIG. 8, the bowl 1 and the lid 2 are similar to those of the first embodiment shown in FIGS. 2 to 7, with the exception of the following features:
- the upper edge 1E of the bowl is folded over rather than rolled;
- the side edge 2B of the lid 2 comprises only two sections, namely a first vertical section 2C similar to the first section of the variation shown in FIGS. 2 to 7, as well as a second re-entrant horizontal section 2D, substantially similar to the second section in the variation shown in FIGS. 2 to 7. In contrast, the side edge 2B does not have a third section 2E extending the second section 2D.

This second variation also differs in the conformation of the gasket 7. While it still has a substantially U-shaped cross section as in the first variation, it also has a radial nick for fixing the gasket 7 on the lid 2, said nick being conformed for the second horizontal section 2D to be fitted therein and received thereby.

In this embodiment, the interstitial space for receiving the gasket 7 is physically defined solely by the horizontal section 2D and the inner face 4 of the side wall 1A.

In a third embodiment, shown in FIG. 9, the bowl 1 and the gasket 7 are similar to those used in the context of the variation shown in FIGS. 2 to 7.

In contrast, the lid 2 differs from the lid employed in said variation of FIGS. 2 to 7 in that its second section 2D extends obliquely to the horizontal, for example at an angle α of α of 15° or more.

Figure 13:
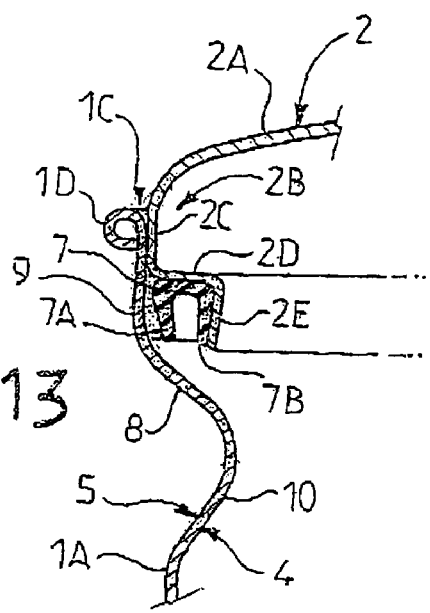
FIG. 13 is a fragmentary longitudinal sectional view of a fourth variation of a cooking appliance of the invention while the user is placing the lid on the bowl.

In a fourth embodiment of the cooking appliance of the invention, shown in FIG. 13, the set of elements of the appliance is identical to that of the variation shown in FIGS. 2 to 7, with the exception that the side wall 1A of the bowl 1 also has a zone 10 that is substantially inwardly convergent of the bowl, in the direction from the base of the bowl 1B towards the opening 1C. The convergent zone 10 which is, for example, in the form of a tapered portion, is located just below the divergent zone 8, for example.

Figure 14:
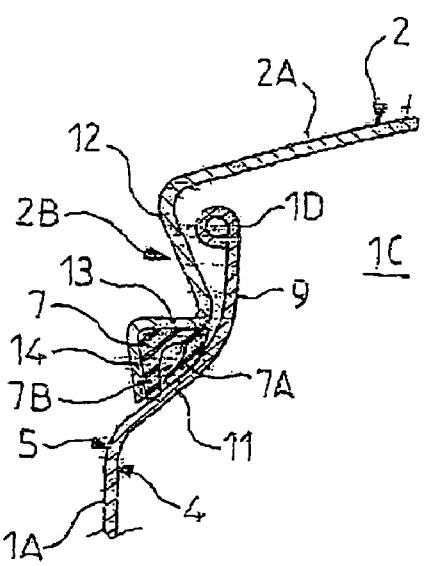
FIG. 14 is a fragmentary longitudinal sectional view of a fifth variation of a cooking appliance of the invention when the lid is locked on the bowl.

In the case of the fifth embodiment shown in FIG. 14, the lid 2 is not a lid with a re-entrant edge, i.e. in contrast, its side edge 2B is designed to surround the outer face 5 of the side wall 1A of the bowl 1.

The side edge 2B of the lid 2 extends from the peripheral edge of the top 2A in a first substantially vertical section 12, which is itself extended by a second substantially horizontal section 13 extending radially outwardly outside the lid 2 and the bowl 1, in a manner substantially parallel to the base 1B.

Finally, the second section 13 is itself prolonged by a third section 14 extending substantially downwardly and outwardly of the appliance, i.e. in a slightly oblique direction relative to the vertical direction X-X'.

It is also envisageable that the first section 12 is oriented obliquely relative to the vertical X/X', in a diverging manner in the direction from the base of the bowl 1B towards the opening 1C.

The side wall 1A extends in the zone 11 defining the interstitial space in a manner that is substantially convergent from the base 1B towards the upper opening 1C.

In this manner, the gasket 7 is interposed between the second and third sections 13, 14 and said convergent zone 11, which preferably has a substantially tapered form.

Figure 15:
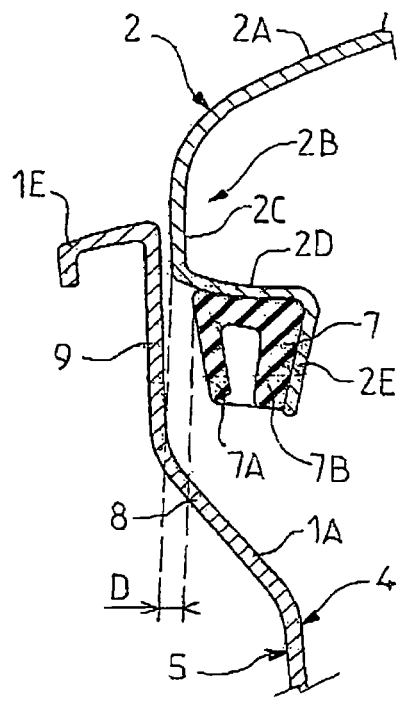
FIG. 15 is a fragmentary longitudinal sectional view of a sixth variation of a cooking appliance of the invention, when the user is placing the lid on the bowl.

In a sixth embodiment shown in FIG. 15, the set of elements of the appliance is identical to that of the variation shown in FIGS. 2 to 7, with the exception that the dimensions of the gasket 7 relative to the second horizontal section 2D of the side edge 2B of the lid are such that it does not project radially outwardly of the lid relative to the first section 2C.

The gasket 7 is thus radially set back by a distance D relative to the first section 2C, said distance D being sufficient to facilitate insertion of the lid 2 in the bowl 1, avoiding any adherent contact between the gasket and the bowl before the lid 2 has attained its final position of insertion, and encouraging metal on metal contact, and thus particularly sliding contact, between the side wall 1A and the first section 2C.

Figure 16:
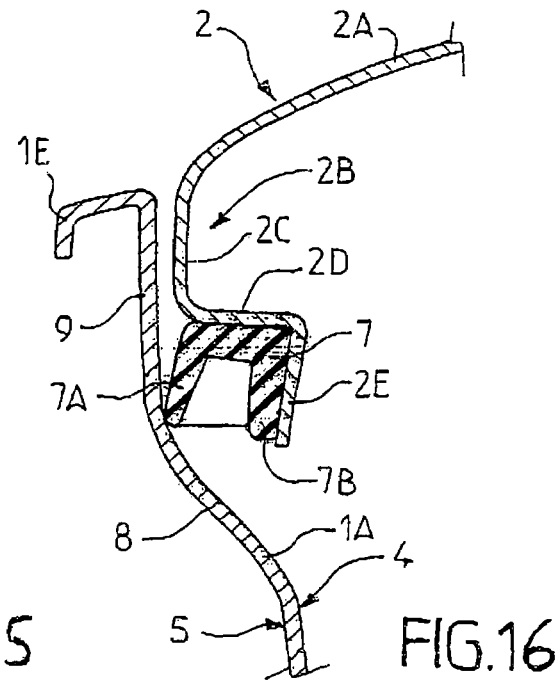
FIG. 16 is a fragmentary longitudinal sectional view of a seventh variation of a cooking appliance of the invention when the appliance is under pressure in normal operation.

In a seventh variation shown in FIG. 16, the bowl 1, the lid 2, and the gasket 7 are designed so that when the appliance is under pressure, in normal operation, the first lip 7A comes into leaktight contact with the vertical end section 9 of the side wall 1A. To this end, the first lip 7A is designed to be able to deflect outwardly of the lid 2, in the radial direction, under the effect of pressure in the vessel.

When the pressure inside the vessel reaches a predetermined critical safety value, the bowl 1 becomes oval, which results in said vertical end section 9 moving away from the gasket 7A, causing a decompression vent.

Figure 17:
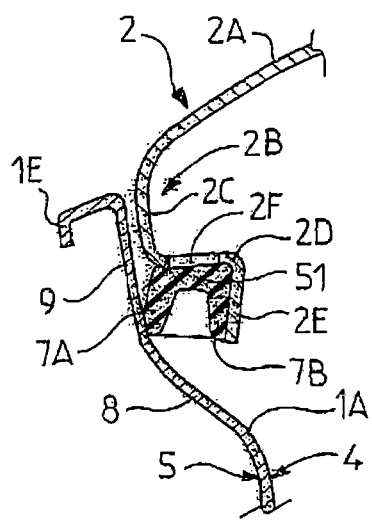
FIG. 17 is a fragmentary longitudinal sectional view of an eighth variation of a cooking appliance of the invention when the appliance is under pressure, in normal operation.

In an eighth variation shown in FIG. 17, the set of elements of the appliance is identical to that of the variation shown in FIGS. 2 to 7, with the exception that the second horizontal section 2D is pierced by at least one extrusion window 2F, through which the gasket 7 is intended to be vertically extruded via its bead 51 when the pressure reaches or exceeds the predetermined critical safety value.

When the critical pressure value is reached, the gasket 7 thus undergoes axial upward translation at least locally extruding through the window 2F. This translation displaces the first lip 7A vertically, to a zone with a wider radial dimension due, for example, to the slope of the side wall 1A in the zone 8. In this variation, then, it is partially the gasket 7 itself which, by moving, positions itself in an interstitial space that is radially wider than the interstitial space in which it is positioned prior to extruding.

This creep of the gasket produces venting of steam with a particularly progressive nature, which contributes to decompression safety.

In a ninth variation, shown in FIGS. 18 and 20, the cooking appliance, which is otherwise identical to that of the variation shown in FIGS. 2 to 7, advantageously includes an interface means 200 for the gasket 7 relative to the lid 2, said interface means 200 being arranged to change between a first configuration (shown in FIG. 18) in which it occupies a predetermined functional volume, when the pressure in the vessel is below the predetermined critical value, and a second configuration (not shown) in which it occupies a restricted volume when the pressure in the vessel reaches or exceeds the predetermined critical value.

Figure 18:
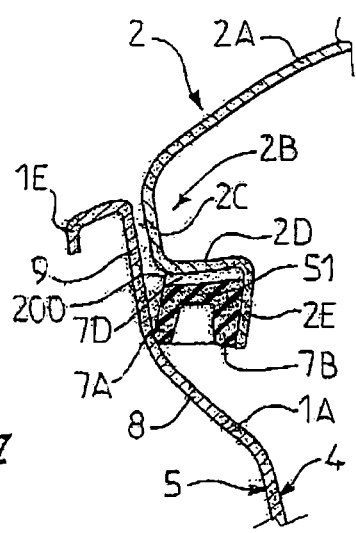
FIG. 18 is a fragmentary longitudinal sectional view of a ninth variation of a cooking appliance of the invention when the appliance is under pressure, in normal operation.
Figure 20:
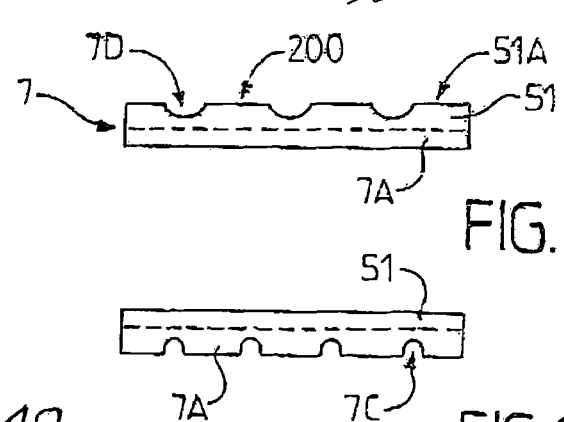
FIG. 20 is a side view of the gasket in the appliance shown in FIG. 18.

Preferably, as shown in FIGS. 18 and 20, the interface means 200 is formed by the bead 51 of the gasket 7, said bead comprising at least one upper notch 7D. This notch 7D endows the gasket 7 with the capacity to crush more easily against the second section 2D in the event of excess pressure.

In other words, when the pressure reaches or exceeds the predetermined critical value in the vessel, the gasket 7, at said at least one notch 7D, is crushed in the vertical direction against the second section 2D, which induces associated translation of the lip 7A into a configuration in which it is not longer able to ensure radial leaktight contact with the side wall 1A.

Alternatively, the interface means 200 can be constituted by a layer of elastic material covering the upper face 51A of the bead 51. The elastic properties of the material forming said layer are selected so that when the pressure in the vessel is below the predetermined critical value, said layer maintains a first predetermined distance between the bead 51 and the second section 2D and, when the pressure reaches or exceeds said predetermined critical value, the layer is crushed, to reduce the distance separating the bead 51 from the second section 2D.

The layer of elastic material covering the bead 51 thus acts as a compression spring of resilience that is determined as a function of the predetermined critical pressure value.

Figure 19:
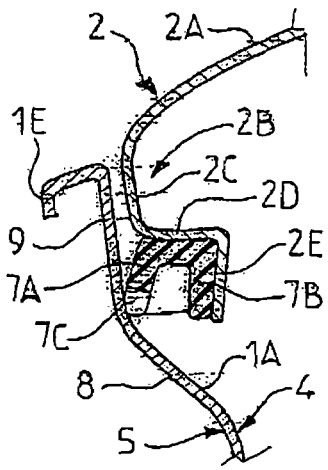
FIG. 19 is a fragmentary longitudinal sectional view of a tenth variation of a cooking appliance of the invention when the appliance is under pressure, in normal operation.
Figure 21:
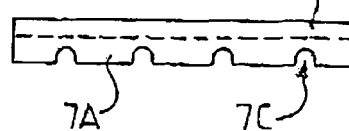
FIG. 21 is a side view of a gasket in the appliance shown in FIG. 19.

In a tenth variation, shown in FIGS. 19 and 21, the cooking appliance is identical to that shown in FIGS. 2 to 7, with the exception that the first lip 7A includes at least one first lower notch 7C provided at the lower end of the lip 7A, opposite the bead 51. Said notch 7C causes local early and progressive safety venting when the pressure in the vessel reaches the predetermined critical safety value. Breakage of the seal is easier in regions in which the quantity of material is lower, as is the case with the lower notches 7C.

Other embodiments of the gasket 7 are described below, it being understood that said gasket may constitute an independent invention.

Advantageously, in the radial direction, at least one angular sector of the gasket 7 is stiffer than that of the remainder of the gasket outside said angular sectors.

In other words, the invention also provides a gasket 7 of flexibility in the radial direction that varies, and in particular a gasket that has localized zones in which the stiffness in the radial direction is increased.

This technical disposition encourages loss of contact between the gasket 7 and the side wall 1A and/or the lid 2 in predetermined regions, corresponding to the zones with greater stiffness, when the pressure inside the vessel reaches a predetermined critical value.

In other words, the gasket 7 has local zones of flexibility that is not great enough to accommodate the difference between the initial dimension DI and the critical dimension DC of the interstitial space 6. Calibrated decompression vents preferentially occur in the zones with greater stiffness, which are preferably distributed regularly around the gasket 7 to encourage venting in zones of the lid which can tolerate them best, namely the zones 22, 23 that are furthest from the locking means 3B, 3C and that are thus subjected to maximum deformation in the case of a critical excess pressure.

This regular distribution of zones of greater stiffness can thus avoid indexing rotation of the gasket 7 around the lid 2.

Advantageously, in the case in which said gasket 7 is a double-lipped gasket as described above, said at least one angular sector is provided with at least one first means for stiffening the first lip 7A, to limit the flexibility of said first lip 7A.

Advantageously, the first lip 7A is produced from a first material in said at least one angular sector, and with a second material outside said angular sector, the first material having a radial stiffness that is greater than that of the second material, the first material thus forming the first stiffening means.

The desired characteristic is achieved in this case by varying the properties of the materials from which gasket 7 is produced.

In a further variation, the first stiffening means comprises a reinforcement 24 embedded in the first lip 7A, said reinforcement preferably being produced from a material which is stiffer than the material used to produce the lip 7A, to strengthen and stiffen said lip 7A.

In a further variation, the first stiffening means comprises an excess thickness 25 of the first lip 7A, said excess thickness 25 being localized on the lip 7A to discourage flexibility of the first lip 7A.

Advantageously, alternatively, or additionally to the first stiffening means, said at least one angular sector is provided with at least one second means for stiffening the second lip 7B to limit the flexibility of said second lip.

The second stiffening means of said second lip 7B may be of a similar nature to that of the first stiffening means.

In particular, the second lip 7B can be formed with a third material in said at least one angular sector, and with a fourth material outside said angular sector, the third material having a radial stiffness that is greater than that of the fourth material, the third material thus forming the second stiffening means.

Advantageously, the second stiffening means can comprise a reinforcement 26 embedded in the second lip 7B.

In a further variation, the second stiffening means can also comprise an excess thickness in the second lip (not shown).

In a preferred embodiment, said at least one first and second stiffening means are formed by at least one unique stiffening means mechanically connecting the first and second lips 7A, 7B to limit the natural flexibility thereof.

Figure 12:
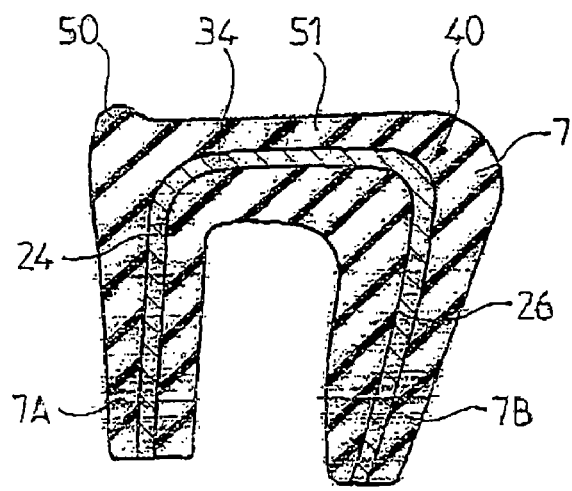
FIG. 12 is a cross section of a fifth variation of a gasket in accordance with the invention.

In addition or alternatively, the single stiffening means can, for example, comprise U-shaped reinforcement 40 with a profile that is similar to that of the cross section of the gasket 7, said reinforcement 40 being integrated into a cross section of the gasket 7 (cf FIG. 12).

The reinforcement thus comprises two arms 24, 26 connected together via a web 34.

The gasket 7 of the invention preferably has varying capacity for deformation in the radial direction, which allows it, early or exclusively, to produce local decompression venting in the zones of the gasket that are stiffest in the radial direction. Such a technical measure is, however, entirely optional; a gasket having continuity and uniformity of its mechanical properties can naturally be employed in the context of the invention, as has been noted above.

Advantageously, and as shown in particular in FIGS. 10, 11 and 12, the gasket 7 of the invention has an annular positioning protuberance 50 which cooperates with the side edge 2B of the lid 2, to maintain the gasket 7 in position in its recess when the first lip 7A operates radially in flexion. The protuberance 50 is preferably located in line with the first lip 7A, and projects from the bead of the gasket at the periphery thereof.

In the case of the variation shown in FIGS. 2 to 7, for example, the protuberance 50 thus cooperates with the first and second sections 2C, 2D, substantially at the junction of said sections 2C, 2D.

Advantageously, the first lip 7A extends substantially obliquely relative to the vertical direction X-X' in a re-entrant manner towards the inside of the gasket, to encourage proper positioning of the gasket in the bowl, i.e. to encourage the first lip 7A to bend towards the second lip 7B when the lid 2 is locked relative to the bowl 1 (cf FIG. 3).

Advantageously, the second lip 7B also extends obliquely relative to the vertical direction in a re-entrant manner inwardly of the gasket, at an angle which matches the angle of the third section 2E. This disposition improves the hold of the gasket on the lid.

Preferably, the lips 7A, 7B then extend in intersecting directions.

The operation of the cooking appliance of the invention is described below, based primarily on the variation described in FIGS. 2 to 7.

Firstly, the user inserts the lid 2 in the bowl 1. Cooperation between the first vertical section 2C of the side edge 2B of the lid and the inner face 4 of the side wall 1A automatically guides the lid 2 relative to the bowl 1.

More particularly, during insertion, contact between the lid 2 and the bowl 1 is made only between the side edge 2B and the side wall 1A, the gasket 7 not adhering to the bowl, which facilitates introduction of the lid.

Once the lid has been inserted, only the first lip 7A bends when the lid is locked on the bowl (cf FIG. 3), the gasket 7 is squeezed against the side wall 1A and operates in compression.

The appliance is then in the leaktight locked position. The user can then raise the pressure in the appliance by exposing it to a source of heat.

When the cooking appliance reaches its regulated pressure, under the pressure inside the bowl, the lid deforms and moves away from the side wall (cf FIG. 5).

However, the seal is maintained by the flexibility of the first lip 7A, which absorbs the deformations of the lid 2 and retains contact with the side wall 1A. Thus, the gasket operates radially.

When the pressure in the vessel reaches a predetermined abnormal critical value, deformation of the lid 2 increases, which causes the lid 2 to move further away from the side wall 1A; the bowl can also become oval under the effect of this excess pressure.

The first lip 7A then loses contact with the side wall 1A and produces gentle and progressive "gasket venting" which constitutes an additional safety measure for the cooking appliance, supplementing the various valves provided conventionally for this purpose.

What is claimed is:

1. A domestic food pressure cooking appliance comprising a bowl provided with a side wall and a lid which can be positioned and locked on said bowl, said lid and side wall co-operating, when the lid is positioned and locked on the bowl, to define an annular interstitial space having an initial cross section having a predetermined radial dimension, termed the initial dimension, said interstitial space being intended to receive an annular gasket designed to be interposed between the side wall and the lid to produce a cooking vessel that is substantially leaktight, wherein the bowl, the lid, and the gasket are designed so that when the pressure inside the vessel reaches a predetermined critical safety value, the interstitial space at least locally has a critical cross section having a predetermined radial dimension, termed the critical dimension, which is greater than the initial dimension, wherein the side wall extends vertically between a base and an upper opening in a manner that diverges from the base to the upper opening and is flared outwardly throughout its extent in the zone defining the interstitial space, so that the difference between the initial dimension and the critical dimension is sufficiently great for the leaktight contact between the gasket and the side wall and/or the lid to be broken, thus causing decompression of the vessel.

2. An appliance according to claim 1, wherein passage from the initial cross section to the critical cross section is at least partially achieved by displacement of the lid relative to the bowl.

3. An appliance according to claim 2, wherein passage from the initial cross section to the critical cross section is at least partially achieved by axial translation of the lid relative to the bowl.

4. An appliance according to claim 1, wherein passage from the initial cross section to the critical cross section is at least partially achieved by radial deformation of the bowl.

5. An appliance according to claim 1, wherein the cross section of the gasket is U-shaped, the arms of the U each respectively forming a first and a second lip while the web of the U forms the bead of the gasket, the first lip ensuring leaktight contact with the side wall, the second lip ensuring leaktight contact with the lid when the latter is positioned and locked on the bowl.

6. An appliance according to claim 1, wherein the stiffness of at least one angular sector of the gasket is greater in a radial direction than that of the remainder of the gasket.

7. An appliance according to claim 5, wherein the stiffness of at least one angular sector of the gasket is greater in a radial direction than that of the remainder of the gasket, and said at least one angular sector is provided with at least one first stiffening means for the first lip, to limit its flexibility.

8. An appliance according to claim 7, wherein the first stiffening means comprises an excess thickness of the first lip.

9. An appliance according to claim 7, wherein said at least one angular sector of the gasket is provided with at least one second stiffening means for the second lip to limit its flexibility.

10. An appliance according to claim 9, wherein said at least one first and second stiffening means are formed by at least one unique stiffening means, mechanically connecting the first and second lips.

11. An appliance according to claim 10, wherein the unique stiffening means comprises a U-shaped reinforcement integrated into a cross section of the gasket.

12. An appliance according to claim 1, wherein passage from the initial cross section to the critical cross section is at least partially obtained by displacement of the gasket relative to the lid.

13. An appliance according to claim 1, wherein it is constituted by a pressure cooker.

14. A seal for a cooking appliance according to claim 1.

* * * * *

UNITED STATES PATENT AND TRADEMARK OFFICE
CERTIFICATE OF CORRECTION

PATENT NO. : 7,637,206 B2 Page 1 of 1
APPLICATION NO. : 10/998317
DATED : December 29, 2009
INVENTOR(S) : Seurat Guiochet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 666 days.

Signed and Sealed this

Ninth Day of November, 2010

David J. Kappos
*Director of the United States Patent and Trademark Office*